D. B. MORISON.
APPARATUS FOR HEATING BOILER FEED WATER.
APPLICATION FILED NOV. 13, 1911.

1,163,436.

Patented Dec. 7, 1915.
2 SHEETS—SHEET 1.

D. B. MORISON.
APPARATUS FOR HEATING BOILER FEED WATER.
APPLICATION FILED NOV. 13, 1911.

1,163,436.

Patented Dec. 7, 1915.
2 SHEETS—SHEET 2.

UNITED STATES PATENT OFFICE.

DONALD BARNS MORISON, OF HARTLEPOOL, ENGLAND.

APPARATUS FOR HEATING BOILER FEED-WATER.

1,163,436.

Specification of Letters Patent.

Patented Dec. 7, 1915.

Application filed November 13, 1911. Serial No. 660,031.

*To all whom it may concern:*

Be it known that I, DONALD BARNS MORISON, a subject of the King of Great Britain and Ireland, residing at Hartlepool, in the county of Durham, England, have invented Improvements in Apparatus for Heating Boiler Feed-Water, of which the following is a specification.

This invention relates to improvements in apparatus for heating boiler feed water, and comprises a reservoir tank having multiple communicating compartments in which feed water delivered from a steam engine condenser together with drainage water, as from steam engines, is heated by means of steam and supplied to the feed pumps.

The invention is particularly applicable for use on steamships in which the feed pumps are driven by the main engines and in which a steam driven feed pump is used alternatively for feeding the boilers, the feed water being heated by exhaust steam from the auxiliary machinery.

The object of the invention is to utilize a maximum quantity of the heat in the exhaust steam from auxiliary machinery on shipboard by condensing it in a body of feed water delivered from the main condenser of the main engines and filtered by simple means so that an approximately uniform and high temperature of feed water is maintained, the heated feed water being delivered to the feed pumps, thereby enabling the pumps to draw water at a constantly maintained high temperature, whereby a maximum quantity of waste steam can be condensed and therefore a high thermal efficiency obtained.

Figure 1:
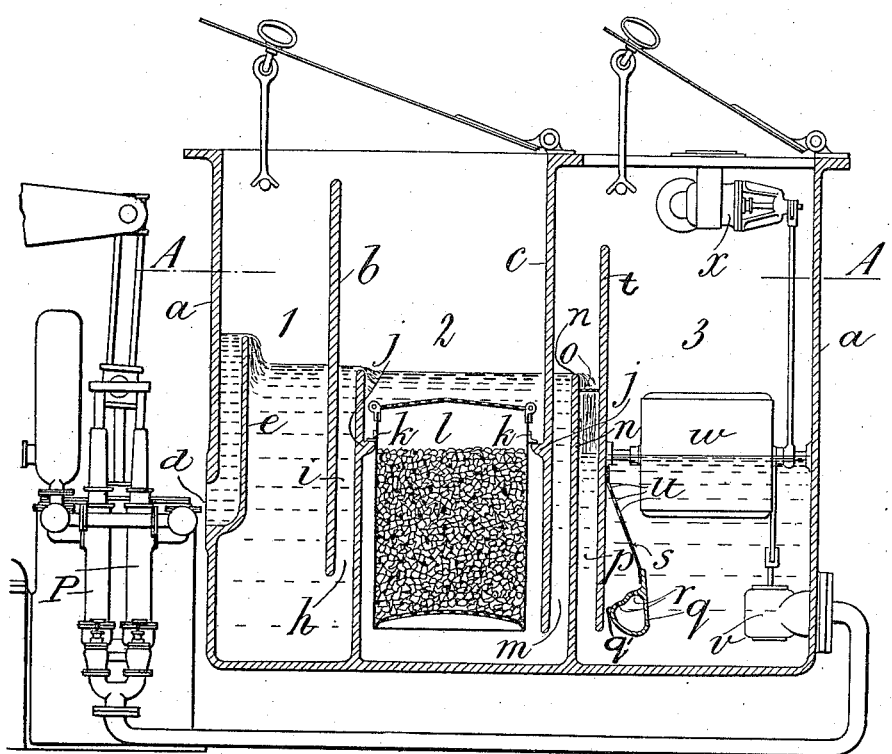
Figure 2:
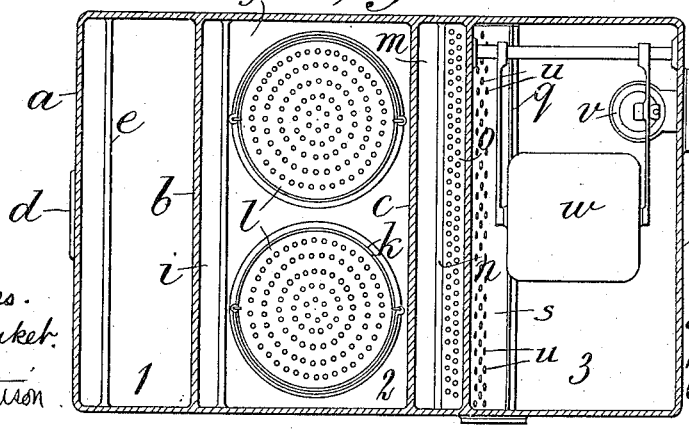
Figure 3:
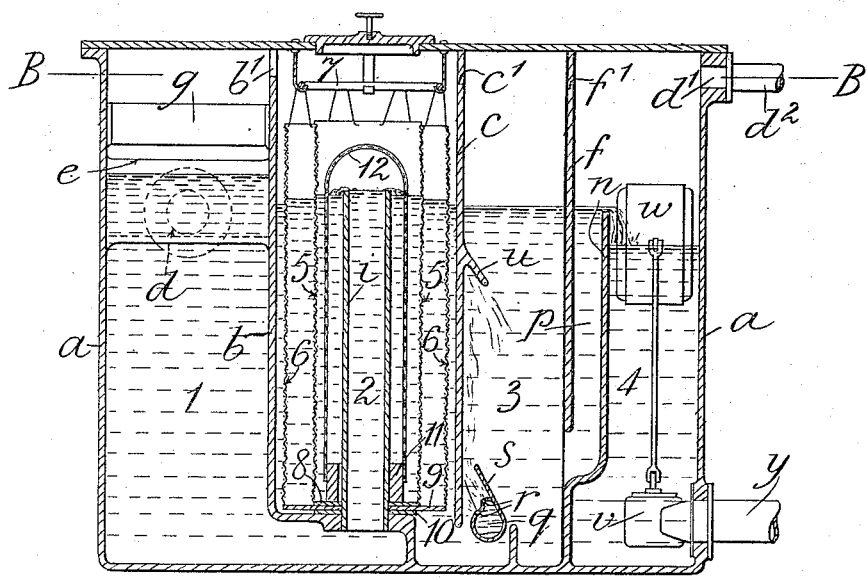
Figure 4:
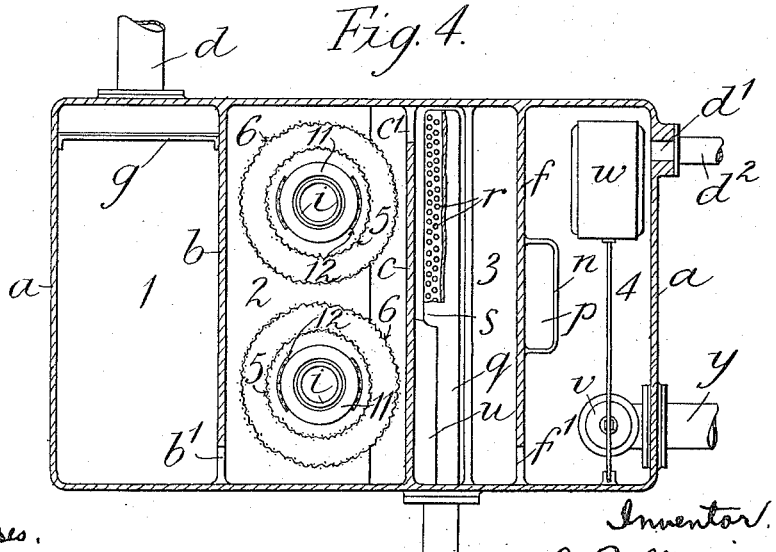

In the accompanying drawings, Figures 1 and 3 show sectional side elevations of two arrangements of apparatus embodying the invention, Figs. 2 and 4 being sectional plan views respectively on the lines A A and B B of Figs. 1 and 3.

In the example shown in Figs. 1 and 2, a reservoir $a$ is divided by the partitions $b$, and $c$, into the compartments 1, 2 and 3. Feed water discharged from a surface condenser, as by an air pump, is delivered, together, it may be, with oily drainage water, into compartment 1 through the inlet $d$ and over the distributing weir $e$ so as to promote the separation and accumulation of floating oil. At the bottom of the compartment 1 the water flows through an opening $h$ and by way of a passage $i$ into the compartment 2 containing the portable vessels $l$ which are filled with filtering material and fit into apertures in a division plate $j$, the joint between angle bearers $k$ fixed on the vessels $l$ and the top of the division plate $j$ being rendered water tight. The vessels $l$ are perforated at the bottom and provided with perforated covers on the top, and are constructed and arranged to be easily removable so that when the filtering material becomes charged with oil, the vessels can be quickly replaced by spare vessels containing clean filtering material. After passing through the filtering vessels the cleansed water flows up a passage $m$ and over a weir $n$ which is so arranged as to maintain a head of water above the filtering vessels $l$ so as to promote the accumulation of floating oil in compartment 2. The water then passes through a perforated plate $o$ and down a distributing channel $p$, which is so arranged in combination with a heating nozzle or device $q$ that the water flowing from the previous compartment 2 will flow into the passage between the heating nozzle and adjacent side walls of the compartment 3 and be heated, such water being supplemented with water from the compartment 3 which contains heated feed water in bulk and therefore promotes approximate equality of temperature notwithstanding intermittent supplies of the heating steam. The heating device $q$ consists of a horizontal pipe having longitudinal projections $q^1$ arranged in steps and provided with perforations $r$ for the upward discharge of steam in multiple jets. $s$ is an upwardly extending guide plate connected at the bottom to the pipe $q$ and at the top to a partition $t$ forming one side of the channel $p$, the upper portion of the plate $s$ having multiple perforations $u$ for the outlet of the heated water and the even distribution of any uncondensed vapor when the water is at a high temperature, thereby promoting the thorough condensation of the steam and minimizing disturbance on the surface of the water in the compartment 3. The jets of steam issuing at a high velocity through the perforations $r$ in the pipe $q$ cause such a rapid circulation of water that the contents of the compartment 3 are repeatedly brought into contact with the steam before being discharged from the tank, thus promoting very efficient condensation of the steam and enabling the water to be raised to a high temperature. The compartment 3 also contains a float $w$ which operates a valve $v$ so as automatically to prevent the level of the water in the compartment from falling below a certain point. The float $w$ may also be connected to a valve $x$ controlling the supply of steam to an independent steam driven feed pump which has its suction connected to the compartment 3.

Figs. 3 and 4 show a modification of the apparatus illustrated in Figs. 1 and 2 and in which the reservoir $a$ is divided by the partitions $b$, $c$, and $f$ into the four compartments 1, 2, 3 and 4. The water entering the inlet $d$ flows over the weir $e$ above which is arranged a plate $g$, the narrow longitudinal opening thus formed being approximately equal in area to the cross sectional area of the water flowing over the weir, thereby promoting uniform distribution of the water across the entire width of the weir. The compartment 2 contains one or more groups of textile fabrics, the group or each group comprising two or more cylindrical or bag shaped pieces 5 and 6 of fabric concentrically arranged around the vertical inlet pipe $i$ which is in communication with the oil separating compartment 1. The bags are suspended from the top of the tank $a$ by a ring 7 and are stiffened at the bottom by the washers 8 and 9, another washer 10 being provided on the bottom of the compartment on which the washers 8 and 9 are held by a removable weight 11, the arrangement providing a practically water tight joint between the bottom portions of the bags and the bottom of the compartment 2, a strap 12 being provided for the purpose of withdrawing the weight 11 when required.

In the arrangement described, the water flows up the central pipe $i$ and through the bags 5 and 6; or, according to another arrangement, the flow may be in the reverse direction. The cleansed water flows into the compartment 3 in which it is heated and caused to circulate by the heating device $q$ which consists, as in Figs. 1 and 2, of a horizontal pipe or casting having longitudinal projections arranged in steps and provided with outlets $r$ for the discharge of steam; or the outlets $r$ may alternatively be provided in an inclined surface or surfaces, one side of the pipe having an inclined or horizontal extension or plate $s$ so disposed as to direct the upwardly circulating water against the side of the partition $c$ which is provided at a higher point but below the water level with a projection $u$ for deflecting the upward flow of water and preventing surface disturbance. The projections $s$ and $u$ are partly broken away in Fig. 4 in order to show the steam discharge outlets $r$. Heated water flows from the compartment 3 through the passage $p$ and over the weir $n$ into the compartment 4 which contains the valve $v$ controlled by the float $w$ for the purpose hereinbefore described. The partitions $b$, $c$ and $f$ are slotted at the top on opposite sides of the tank at $b^1$, $c^1$ and $f^1$, and the outlet end of the tank is provided with an opening $d^1$, the arrangement and disposition of the openings being such that on closing the valve $v$, or a valve situated in the delivery pipe $y$ from the tank, the water will rise in each compartment until it reaches the level of the openings $b^1$, $c^1$, $f^1$ and $d^1$ when the floating oil will flow in a diagonal course through each compartment to an overflow pipe $d^2$.

The steam heating device can be placed in any desired compartment of the apparatus. In Fig. 1 the compartment 3 is shown connected to the main engine driven pumps P to which heated water is supplied from the said compartment through the valve $v$ under a practically constant head maintained by the float $w$. As shown in Fig. 1 the float $w$ may also be connected to and operate a valve $x$ arranged to control, in known way, the supply of steam to an independent steam driven feed pump.

What I claim is:—

1. Apparatus for heating and controlling the supply of water to feed pumps, comprising a tank containing communicating compartments, a submerged water heating device arranged in one of the compartments, a water outlet valve arranged in the final compartment and a float controlling the said outlet valve whereby a head of water can be maintained above said outlet valve.

2. Apparatus for heating and controlling the supply of water to feed pumps, comprising a tank containing communicating compartments through which the water can flow from the first or inlet compartment to the final or outlet compartment, a submerged water heating and circulating device arranged in one of the compartments, a water outlet valve arranged in the final compartment and a float controlling the said outlet valve whereby water can be supplied from the outlet compartment to feed pumps under a head.

3. Apparatus for heating and controlling the supply of water to feed pumps, comprising a tank containing communicating compartments through which the water can flow, a submerged water heating device arranged in one of the compartments, a water outlet valve arranged in the final compartment, a second valve arranged in said final compartment and adapted to control the steam supply valve of an independent steam driven feed pump, and a float arranged in said final compartment and connected to said outlet valve so as to maintain a head of water above said outlet valve and connected also to said second valve to control the supply of steam therethrough.

4. Apparatus for heating and controlling the supply of water to feed pumps, comprising a tank containing communicating compartments through which the water can flow from the first or inlet compartment to the final or outlet compartment, a submerged water heating device arranged in the final compartment, and a float and connected water outlet valve also arranged in the final compartment and whereby a head of water can be maintained in said compartment.

5. Apparatus for heating and controlling the supply of water to feed pumps, comprising a tank containing communicating compartments through which water can flow, a submerged water heating and circulating device arranged in one of said compartments and from which steam can issue and come in contact with the water in the compartment and a float operated valve in the final compartment whereby a head of water can be maintained above the suction valves of the feed pumps.

6. Apparatus for heating and controlling the supply of water to feed pumps, comprising a tank containing communicating compartments through which the water can flow, a submerged water heating and circulating device arranged in one of said compartments, a guide plate arranged to facilitate the rapid circulation of the water already in the compartment as well as that entering such compartment and a float operated valve arranged to maintain a head of water in the final compartment.

7. Apparatus comprising a tank divided by partitions into communicating compartments to contain water, and a steam heating device arranged in one of said compartments so as to heat a supply of water coming from one of the other compartments which said supply of water is supplemented with water at a higher temperature from the heating compartment.

8. Apparatus for heating water comprising a tank containing compartments communicating with each other, two of said compartments being in communication with each other through an opening extending substantially the whole width of the compartments and located near the lower end of one of them and through which the water can flow, a submerged water heating and circulating device arranged in one of the compartments adjacent to said opening and extending substantially the whole width of such opening, water guiding means arranged to facilitate the rapid circulation of the water already in the compartment as well as that entering the compartment through said opening, a water outlet valve arranged in the final compartment and a float controlling the said outlet valve whereby a head of water can be maintained above said outlet valve.

9. Apparatus for heating and controlling the supply of water to feed pumps, comprising a tank containing communicating compartments through which the water can flow from the first or inlet compartment to the final or outlet compartment, two of such compartments being in communication with each other through an opening extending substantially the whole width of said compartments, feed pumps connected to said final or outlet compartment, a submerged water heating and circulating device arranged in one of the compartments adjacent to said opening and extending substantially along the whole width of said compartment, a guide plate arranged to facilitate the rapid circulation of the water already in the compartment as well as that entering the compartment through said opening, a water outlet valve arranged in the final compartment and a float controlling the said outlet valve whereby water can be supplied from the outlet compartment to said feed pumps under a head.

10. Apparatus for heating and controlling the supply of water to feed pumps, comprising a tank containing communicating compartments through which the water can flow from the first or inlet compartment to the final or outlet compartment the communication between the final compartment and the preceding compartment being in the form of an opening extending substantially the whole width of the final compartment, a submerged water heating and circulating device arranged in the final compartment adjacent to said opening and extending substantially along the whole width of said compartment, a guide plate arranged to facilitate the rapid circulation of the water already in the compartment as well as that entering the compartment through said opening, and a float and connected water outlet valve also arranged in the final compartment and whereby a head of water can be maintained in said compartment.

11. Apparatus for heating water, comprising a tank containing communicating compartments through which water can flow, two of said compartments being connected together through an opening located near the bottom of one of them and extending substantially the whole width of said compartments, a submerged water heating and circulating device arranged in one of said compartments near to said opening and comprising a horizontal tube provided on its upper side only with steam exit apertures, a perforated guide plate extending above said tube and inclined toward one side of the compartment in which it is placed to facilitate rapid condensation of steam and rapid circulation of the water and a float operated outlet valve in the final compartment.

12. Apparatus for heating and controlling the supply of water to feed pumps, comprising a tank containing communicating compartments through which the water can flow, a submerged water heating and circulating device of tubular shape arranged within and extending substantially across the whole width of one of said compartments adjacent to a wide opening connecting said compartment to the preceding compartment, said tubular device having a stepped upper side having rows of upwardly directed steam outlet apertures therein, a perforated inclined guide plate carried by and extending above said tubular device and a float operated valve arranged to maintain a head of water in the final compartment.

13. In apparatus for heating boiler feed water, a vessel having a water inlet discharging into it near its lower end, a submerged water heating and circulating device arranged in said vessel near to the bottom thereof and near to the discharge end of the water inlet and from which steam can issue in an upward direction only and a perforated plate extending upwardly from the heating device and terminating at its upper end near to the adjacent side wall of the vessel.

14. In apparatus for heating water for feed pumps, a vessel having a water inlet discharging into it near the bottom thereof, a steam heating and circulating device submerged in the said vessel near to the bottom thereof and adjacent to the discharge end of said water inlet and through which steam can issue in an upward direction, a perforated plate extending upwardly from the heating device and terminating at its upper end near to the adjacent side wall of the vessel and a float operated water outlet valve by means of which a head of water can be maintained in said vessel above the outlet valve.

15. Apparatus for heating and controlling the supply of boiler feed water, comprising a vessel having a water inlet discharging into it near the bottom thereof, a submerged water heating and circulating device arranged in said vessel near to the discharge end of said water inlet and a float controlled water outlet valve and steam control valve in said vessel.

Signed at West Hartlepool this first day of November, 1911.

DONALD BARNS MORISON.

Witnesses:
HARRY FOTHERGILL,
JOHN COOKE.

Copies of this patent may be obtained for five cents each, by addressing the "Commissioner of Patents, Washington, D. C."